(12) United States Patent
Mundt et al.

(10) Patent No.: US 8,485,443 B2
(45) Date of Patent: Jul. 16, 2013

(54) APPARATUS AND METHOD FOR SENSING AN INTEGRATED CIRCUIT CARD

(75) Inventors: Kevin Mundt, Austin, TX (US); Andrew Thomas Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 12/872,287

(22) Filed: Aug. 31, 2010

(65) Prior Publication Data
US 2012/0048935 A1 Mar. 1, 2012

(51) Int. Cl.
*G06K 7/06* (2006.01)

(52) U.S. Cl.
USPC .......................................... 235/441

(58) Field of Classification Search
USPC .................. 235/492, 435, 439, 441
See application file for complete search history.

(56) References Cited

U.S. PATENT DOCUMENTS

| 5,594,233 | A | 1/1997 | Kenneth et al. | |
|---|---|---|---|---|
| 6,045,043 | A | 4/2000 | Basahn et al. | |
| 6,738,259 | B2 * | 5/2004 | Le et al. | 361/737 |
| 7,458,511 | B2 * | 12/2008 | Takimoto | 235/382 |
| 7,719,847 | B2 * | 5/2010 | Mambakkam et al. | 361/737 |
| 2007/0194132 | A1 | 8/2007 | Brown et al. | |
| 2009/0186657 | A1 * | 7/2009 | Dewnani et al. | 455/558 |

\* cited by examiner

*Primary Examiner* — Seung Lee
(74) *Attorney, Agent, or Firm* — Baker Botts L.L.P.

(57) ABSTRACT

An apparatus for sensing an integrated circuit (IC) card may include a bottom surface in contact with a chassis of an information handling system (IHS) to form a slot for receiving at least one type of IC card and a top surface in communication with a transmitting element for sensing a first type of IC card inserted within the slot. The apparatus further includes a contact field disposed on the bottom surface, the contact field for sensing a second type of IC card inserted within the slot.

20 Claims, 4 Drawing Sheets

APPARATUS AND METHOD FOR SENSING AN INTEGRATED CIRCUIT CARD

TECHNICAL FIELD

The present disclosure relates generally to the field of information handling systems, and more specifically, to methods and apparatus for sensing integrated circuit (IC) cards with information handling systems.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Integrated circuit (IC) cards and information handling systems (IHSs) have increasing applicability in daily business functions. Therefore, attention is drawn towards methods to integrate the IC card with the IHS to achieve all-in-one functionality. As a result, current IHSs are manufactured to provide limited IC card readability. In general, IC cards can be categorized into various types including contact IC cards or contactless IC cards. Contact IC cards typically contact a contact field of an electronic device, the contact field comprising several contact pins which allow for information and electric power transfer. In contrast, contactless IC cards may contain a mechanism to allow communication without contact, such as with a reader through identification methods such as radio-frequency identification (RFID).

Currently, in the case of a portable IHS, an IC card slot located on one side of the portable IHS may only accommodate a contact IC card but does not allow for readability of a contactless IC card. In order to take advantage of the convenience of contactless IC cards, an antenna may be mounted to the portable IHSs for communicating with the contactless IC card. Should a user close the lid of the portable IHS (e.g., a laptop), the antenna may be blocked from communicating with the contactless IC card. Further, if the laptop should function as a tablet causing the screen to cover the area where the antenna is mounted, the contactless IC card may not be properly sensed. Additionally, material (e.g., metal) from which the IHS chassis is constructed may interfere or block antenna signals, thus preventing the sensing of the contactless IC card.

Current systems may comprise adapters to allow a contact IC card to be sensed by a contactless IC card reader while allowing a contactless IC card to be sensed by a contact IC card reader. However, the addition of an adaptor to the IHS may require additional parts and not be cost effective. Further, in some circumstances, even with an adaptor, the communication pathway between the portable IHS and the contactless IC card may be interfered with or blocked. Thus, there exists a need for improved apparatus, systems and methods which enhance the readability of contact and/or contactless IC cards by IHSs.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for an apparatus for sensing an integrated circuit (IC) card whereby the apparatus includes a bottom surface in contact with a chassis of an information handling system (IHS) to form a slot for receiving at least one type of IC card. The apparatus includes a top surface in communication with a transmitting element for sensing a first type of IC card inserted within the slot. The apparatus further includes a contact field disposed on the bottom surface, the contact field for sensing a second type of IC card inserted within the slot.

Another aspect of the present disclosure provides for an information handling system including a chassis and a sensing apparatus disposed within the chassis. The sensing apparatus is in contact with the chassis to form a slot for receiving at least one type of integrated circuit (IC) card, wherein the sensing apparatus comprises a top surface and a bottom surface. The bottom surface includes a contact field disposed thereon for sensing a first type of IC card inserted within the slot and the top surface is in communication with a transmitting element for sensing a second type of IC card inserted within the slot.

Yet another aspect of the disclosure provides an information handling system (IHS) including a chassis, a housing disposed within the chassis, and an apparatus for sensing an integrated circuit (IC) card. The apparatus is in contact with the housing to form an inlet end of a slot for receiving at least one type of IC card, where the apparatus is in contact with the housing to further form a closed end of the slot. The apparatus further includes a bottom surface with a contact field disposed thereon for sensing a first type of IC card inserted within the slot and a top surface in communication with a transmitting element for sensing a second type of IC card inserted within the slot.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present apparatus, systems and methods are described, it is to be understood that this disclosure is not limited to the particular apparatus, systems and methods described, as such may vary. Also, the present disclosure is not limited in its application to the details of construction, arrangement or order of components and/or steps set forth in the following description or illustrated in the figures. Thus, the disclosure is capable of other aspects, embodiments or implementations or being carried out/practiced in various other ways.

One of ordinary skill in the art should understand that the terminology used herein is for the purpose of describing possible aspects, embodiments and/or implementations only, and is not intended to limit the scope of the present disclosure which will be limited only by the appended claims. Further, use of terms such as "including", "comprising", "having", "containing", "involving", "consisting", and variations thereof are meant to encompass the listed thereafter and equivalents thereof as well as additional items.

It must also be noted that as used herein and in the appended claims, the singular forms "a," "and," and "the" may include plural referents unless the context clearly dictates otherwise. Thus, for example, reference to "a card" refers to one or several cards and reference to "a method of sensing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
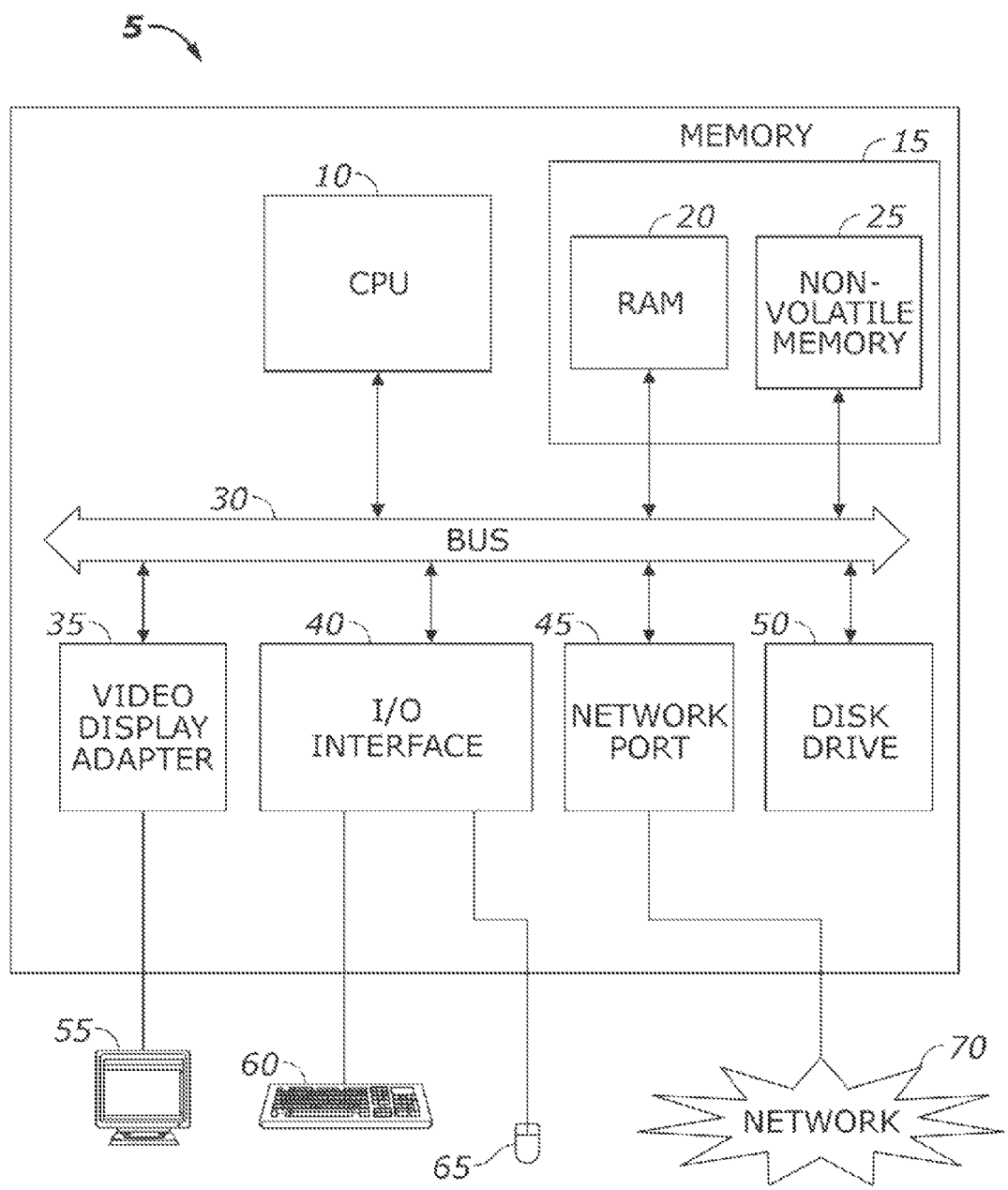
FIG. 1 represents an information handling system (IHS) in accordance with one aspect of the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic/input output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2A:
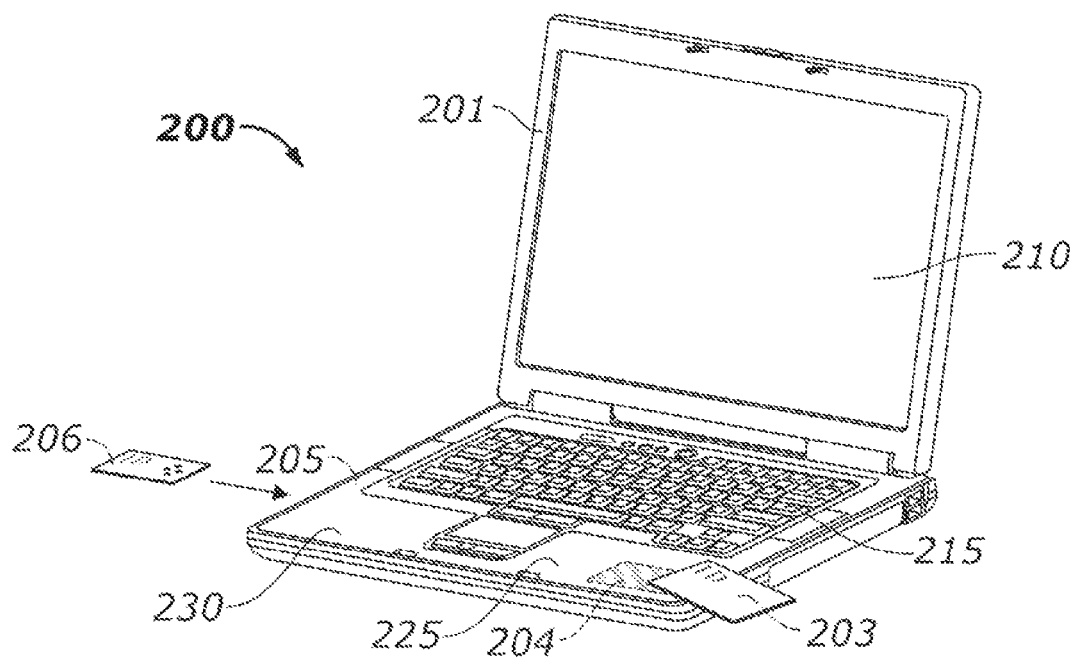
FIG. 2A provides a schematic of a portable IHS in a lid open position while sensing an integrated circuit (IC) card.

FIG. 2A schematically depicts a conventional portable IHS 200 in a lid open position while sensing IC cards 203, 206. As shown, an open position occurs when the lid 201 is in a position to allow a user to view the display 210. The lid 201 is movable about a pivot point 215 to move between an open position, as shown in FIG. 2A, to a closed position, to be described below.

Although the present disclosure describes apparatus and systems for sensing IC cards, it should be understood that the present disclosure is applicable to sensing any conventional storage medium, such as a card for storing and/or transmitting data. Such card may contain an embedded circuit, memory storage components, and/or dedicated security logic. Examples of cards to be sensed by apparatus and systems described herein may include, but are not limited to, integrated circuit (IC) cards, smart cards, or the like. Smart cards, for example, may provide identification, authentication, data storage and/or application processing when utilized in combination with IHSs.

As previously mentioned, IC cards can be categorized into various types including contact IC cards or contactless IC cards. Contact IC cards typically have a contact field, comprising contact pins which allow for information and electric power transfer. In contrast, contactless IC cards may contain a mechanism to allow communication with a reader and/or electronic device through identification methods such as radio-frequency identification (RFID) or the like.

A conventional portable IHS 200 may comprise a card slot 205 for receiving a contact IC card 206. The portable IHS 200 may further comprise a communication region 204 for sensing a contactless IC card 203. A contact IC card 206 may be inserted into the card slot 205 to trigger communication between the contact IC card 206 and the portable IHS 200 or a card reader (not shown) coupled to the IHS. The card slot 205 may define a contact field, such as a conductive pad made of copper or suitable conductive material, for providing electric conductivity. In this implementation, such contact field may comprise one or multiple pins to selectively transmit data from the contact IC card 206 to the portable IHS 200 when the contact IC card 206 is inserted into the card slot 205.

Either the card slot 205 or the communication region 204 may be disposed on any location of the portable IHS 200. The communication region 204, having an antenna mounted thereto, in some implementations, may be disposed on any location of the portable IHS 200 to enable radio frequency (RF) transparency to achieve communication between the contactless IC card and the antenna. As shown, the communication region 204 may be located on a palmrest 225 of the portable IHS 200. In one implementation, the card slot 205 and the communication region 204 may be disposed on opposing edges of the portable IHS chassis 230. Further, the communication region 204 may be primarily made of any suitable material, such as rigid plastic, for example, to reduce or eliminate interference or blockage of RF signals.

Referring still to FIG. 2A, the communication region 204 of the portable IHS 200 may be communicatively coupled to an antenna or any conventional transmitting element coupled to the portable IHS chassis 230 to allow the communication region 204 to sense a proximately placed contactless card 203.

Figure 2B:
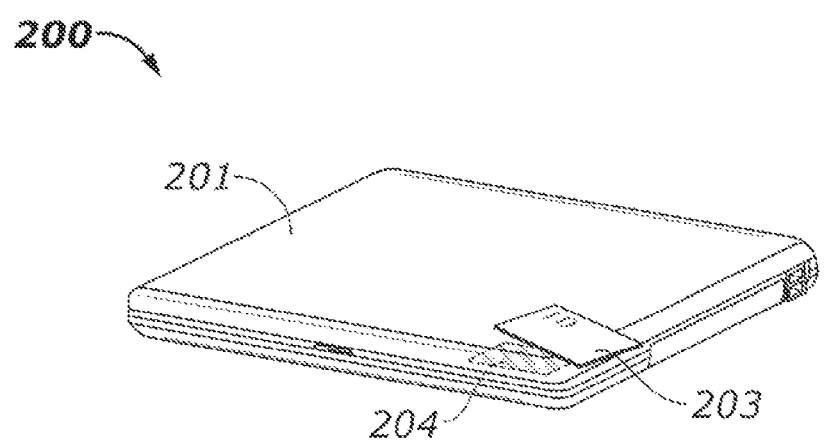
FIG. 2B provides a schematic of a portable IHS in a lid closed position.

Turning now to FIG. 2B, a schematic is shown of a conventional portable IHS 200 in a lid closed position. As shown, a lid closed position occurs when the lid 201 either partially or fully covers the keypad 215 of the portable IHS 200 in such a way as to prevent a user from viewing the display. In the lid closed position, the palmrest 225 and/or communication region 204 may be blocked by the lid 201 of the portable IHS 200. Accordingly, the communication pathway between the communication region 204 and a contactless IC card 203 placed in proximity to the palmrest 225 may be interfered with or blocked by the lid 201 of the portable IHS 200. Therefore, a conventional portable IHS 200, as depicted in FIGS. 2A & 2B, may contain a communication region 240 which may fail to sense a contactless IC card 203 when the lid 201 is in a closed position.

Figure 3A:
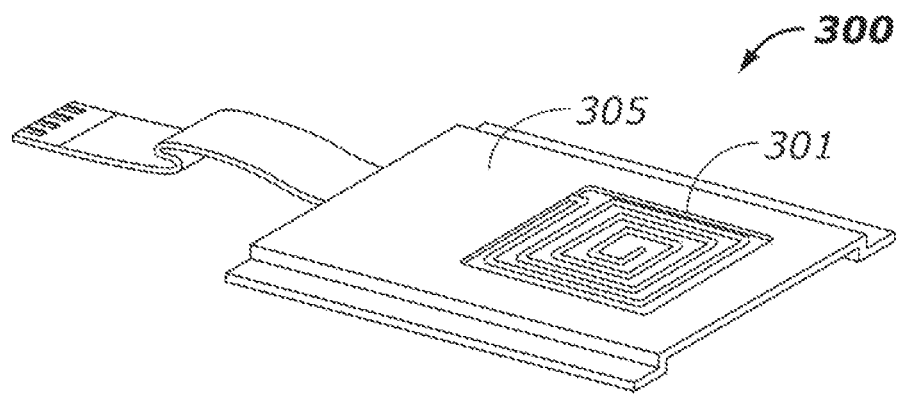
FIG. 3A depicts a plan view of an apparatus for sensing an IC card in accordance with one aspect of the present disclosure.

FIG. 3A depicts a plan view of a sensing apparatus for sensing an IC card, the sensing apparatus indicated generally at 300. It should be understood that the terms sensing apparatus 300 and apparatus are used interchangeably herein. In one implementation, the sensing apparatus 300 is shown having a transmitting element 301 disposed thereon for sensing a contactless IC card placed in proximity to the sensing apparatus 300. In another implementation, the transmitting element 301 may be disposed on the chassis of a portable IHS such that a surface of the sensing apparatus 300 may be in communication with the transmitting element 301. It should be understood that the sensing apparatus 300 may sense information stored on a card, such as a contactless IC card, for example, by way of detecting, reading, identifying, perceiving, receiving, handling, or understanding such information. The transmitting element 301 may be a low power transmission antenna for contactless or Near Field Communication (NFC). The contactless transmission of data offered by the transmitting element 301 may provide advantages over interactions involving contact IC cards, such as faster transmission speed of data and ease of use. The transfer or reading of information for contactless transmission via the contactless IC card is achieved by sending signals such as radio frequency (RF) signals, for example, between the contactless IC card and the transmitting element 301 in communication with a surface of the sensing apparatus 300. A user may place the contactless IC card in proximity to the sensing apparatus 300, such as a transmitting element 301 disposed thereon, to enable the transmitting element 301 to sense/read the identification data contained on the IC card. Data from the transmitting element 301 may then be transmitted to the portable IHS 200 and/or IHS processor through means by which any conventional antenna may transmit information.

In FIG. 3A, the transmitting element 301 is shown disposed on a top surface 305 of the sensing apparatus 300. When in contact with (e.g., mounted within) the chassis 230 of a portable IHS 200 beneath the palmrest 225, for example, the top surface 305 of the sensing apparatus 300 may be upward facing to form a communication region on the palmrest 225 for sensing a proximately placed contactless IC card. Generally, the transmitting element 301 may be placed in proximity to the top surface 310 of the sensing apparatus 300 to enable communication between the transmitting element 301 and a contactless IC card inserted into the slot formed between the sensing apparatus 300 and chassis 230. In one implementation, the transmitting element 301 is disposed on the top surface 310 of the sensing apparatus 300.

Figure 3B:
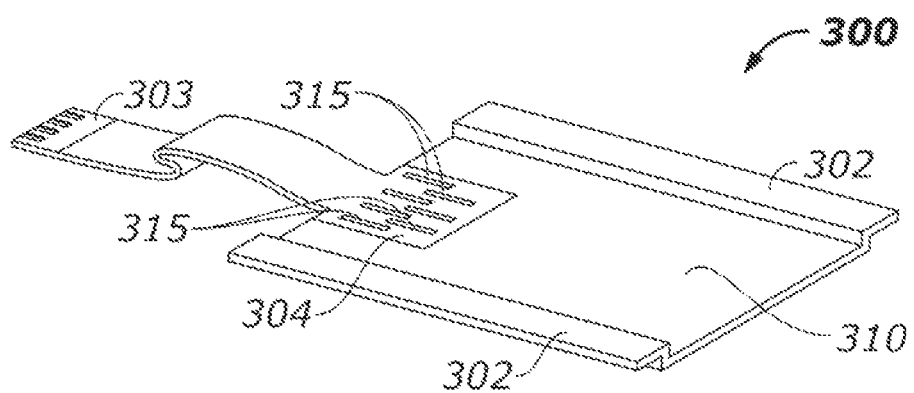
FIG. 3B depicts an alternate view of an apparatus for sensing an IC card in accordance with one aspect of the present disclosure.

Referring now to FIG. 3B, a schematic is shown of a bottom surface 310 of the sensing apparatus 300 depicted in FIG. 3A. It should be understood that FIG. 3A depicts a view of the top surface 305 of the sensing apparatus 300, while FIG. 3B depicts a view of the bottom surface 310 of the same sensing apparatus 300. The generally planar surface of the bottom surface 310 may receive a contact IC card or contactless IC card. Raised edges 302 on either side of the planar surface may contact the chassis 230 of the portable IHS 200 to form a slot into which a contact IC card or contactless IC card may be inserted. The bottom surface 310 may include a contact field 304 mounted thereon containing multiple contact pins 315 for sensing and reading the contact IC card when in contact with the contact field 304.

While one end of the contact field 304 may contact the sensing apparatus 300, the other end of the contact field 304 may define a connecting element 303. Such connecting element 303 may contact internal structures (i.e., motherboard) of the portable IHS 200 as to enable the transfer of data between the contact IC card and the portable IHS. As shown the transmitting element 301 and the contact field 304 may both be disposed on the sensing apparatus 300 (e.g. a single PCB with antenna trace).

As previously mentioned, the sensing apparatus 300 may provide a slot when in contact with an IHS chassis to receive either a contact IC card or a contactless IC card. When inserted into the sensing apparatus 300, the contactless IC card may communicate with the transmitting element 301 or the communication region 204 formed thereby. In one implementation, the sensing apparatus 300 may be formed of rigid plastic which may provide an RF-transparent environment for communication between the contactless IC card and the transmitting element 301. In this implementation, when the lid 201 of the portable IHS 200 is in a closed position, the contactless IC card 203 can still be sensed or read by the transmitting element 301 or the communication region 204 of a portable IHS 200. Therefore, the sensing apparatus 300, when disposed within a portable IHS 200, may provide consistent communication between an IC card and a portable IHS 200, whether the portable IHS 200 is in a lid open or lid closed position.

Figure 4:
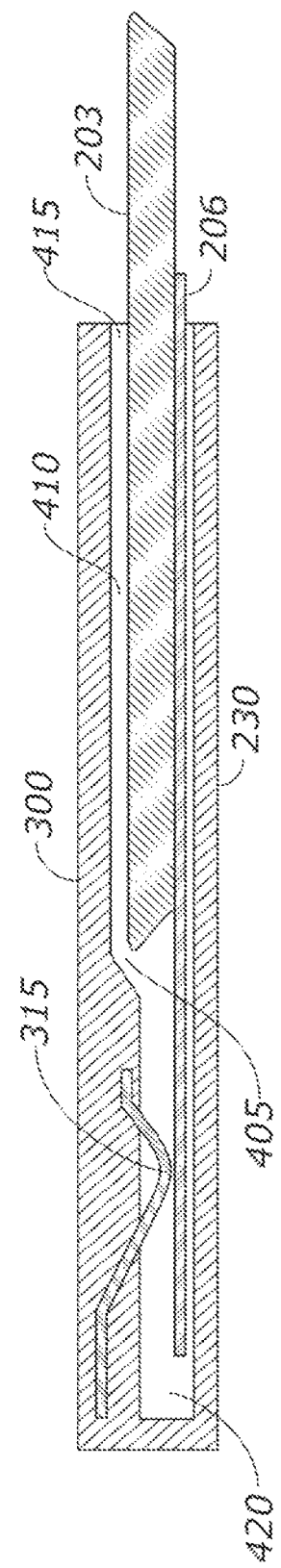
FIG. 4 depicts a cross section view of an apparatus for sensing an IC card in accordance with one aspect of the present disclosure.

Turning now to FIG. 4, a cross section view is provided depicting an apparatus 300 for sensing at least one type of IC card. As shown, the sensing apparatus 300 may contact the chassis 230 of a portable IHS to form a slot 410 for receiving a contact IC card 206 or a contactless IC card 203. Once inserted, the contact IC card 206 may contact the contact pin 315, as part of the previously mentioned contact field 304, to enable the sensing apparatus 300 to sense information from the contact IC card 206. In one implementation, the sensing apparatus' contact field, with at least one contact pin 315 disposed thereon, may be located near the rear (i.e., closed end 420) of the slot 410. Once inserted into the slot, mating contact pads on the contact IC card 206 may align with the contact pins 315 disposed on the contact field of the sensing apparatus 300.

The length and/or width of the slot 410 may accommodate the full length and/or width of any conventional card (i.e., IC card). The height (i.e., thickness) of the slot 410 may accommodate receiving either a contact IC card 206 or a contactless (e.g., thick or thin) IC card 203. The distinction of a thick or thin IC card is a generally known standard in the industry.

In one implementation, the slot 410 may have a constant height throughout the entire length of the slot 410. As shown in FIG. 4, the height of the slot 410 may be greater at the point of card entry 415 but may eventually reduce towards the closed end 420 of the slot 410 at a reduction point 405. Although either a contactless IC card 203 or contact IC card 206 may be inserted into the slot 410 at the point of card entry 415, the contactless IC card 203, may not be further inserted into the slot 410 past the reduction point 405. The reduction point 405 prevents one of the IC cards, specifically the contactless IC card 203, from contacting the contact field 304 of the sensing apparatus 300. In one implementation, a contact IC card 206 may be inserted into the slot 410 such that the contact IC card 206 may be seated to the full depth of the slot 410 towards the closed end 420. In the case of contactless IC cards, the slot 410 may accommodate the insert of a thin contactless IC card to the full depth of the slot 410 or partial insertion of a thick contactless IC card up to the reduction point 405 within the slot 410. As mentioned, the mating contact pads disposed on the contact IC card 206 may align to mate with the contact pin 315 of the sensing apparatus 300.

In another implementation of the present disclosure, a transmitting element (not shown) may be disposed on a surface of the sensing apparatus 300 proximate to the slot's point of card entry 415. For example, a contactless IC card 203 may be inserted into the slot 410 such that the contactless IC card 203 may be seated only to the reduction point 405. The proximity of the contactless IC card 203 to the transmitting element 301 disposed on the sensing apparatus 300 may activate communication between the contactless IC card 203 and the transmitting element 301. Further, the location of a transmitting element 301 on the sensing apparatus 300 toward the slot's point of card entry 415 may enable the sensing of either a thin or thick contactless IC card. The sensing apparatus 300 may allow the insertion and sensing of either a contactless IC card 203 or a contact IC card 206 regardless of whether the lid of the portable IHS is in an open or closed position.

In another implementation of the present disclosure, the transmitting element may be mounted within the chassis of the portable IHS whereby the transmitting element 301 senses a contactless IC card 203. The sensing apparatus 300 may be disposed within the chassis of the portable IHS and placed in proximity to the transmitting element 301 to enable a card (i.e., contactless IC card) inserted into the slot 410 to communicate with the transmitting element 301.

Apparatus and systems of the present disclosure may generally enhance the sensing and/or readability of IC cards. Such apparatus and systems may allow the sensing and/or reading of either a contactless IC card or a contact IC card when the lid of a portable IHS is in a closed position or when the portable IHS is in a tablet mode. Further, apparatus and systems herein may enable the use of a wireless card, such as a contactless IC card, for example, with a portable IHS having a metal chassis.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An apparatus for sensing an integrated circuit (IC) card, the apparatus comprising:
   a bottom surface in contact with a chassis of an information handling system (IHS) to form a slot for receiving at least one type of IC card;
   a top surface in communication with a transmitting element for sensing a first type of IC card inserted within the slot; and
   a contact field disposed on the bottom surface, the contact field for sensing a second type of IC card inserted within the slot.

2. The apparatus of claim 1, wherein the transmitting element is disposed upon the top surface.

3. The apparatus of claim 1, wherein the transmitting element is disposed upon the chassis of the IHS.

4. The apparatus of claim 1, wherein the contact field comprises a plurality of contact pins mounted thereon to sense data from the second type of IC card.

5. The apparatus of claim 1, wherein a height of the slot is reduced to towards a closed end of the slot to prevent the first type of IC card from contacting the contact field.

6. The apparatus of claim 1, wherein the first type of IC card is a contactless IC card and the second type of IC card is a contact IC card.

7. The apparatus of claim 1, wherein the first type of IC card is a contactless smart card and the second type of IC card is a contact smart card.

8. An information handling system comprising:
   a chassis; and
   a sensing apparatus disposed within the chassis, the sensing apparatus in contact with the chassis to form a slot for receiving at least one type of integrated circuit (IC) card, wherein the sensing apparatus comprises a top surface and a bottom surface, the bottom surface with a contact field disposed thereon for sensing a first type of IC card inserted within the slot and the top surface in communication with a transmitting element for sensing a second type of IC card inserted within the slot.

9. The system of claim 8, wherein the transmitting element is disposed upon the top surface.

10. The system of claim 8, wherein the transmitting element is disposed upon the chassis of the IHS.

11. The apparatus of claim 8, wherein the contact field comprises a plurality of contact pins mounted thereon to sense data from the first type of IC card.

12. The apparatus of claim 8, wherein a height of the slot defined by the first surface and the chassis of the IHS is reduced to towards a closed end of the slot to prevent the second type of IC card from contacting the contact field.

13. The apparatus of claim 8, wherein the first type of IC card is a contact IC card and the second type of IC card is a contactless IC card.

14. The IHS of claim 13, wherein a height of the slot defined by the bottom surface and the chassis of the IHS is reduced to towards a closed end of the slot to prevent the second type of IC card from contacting the contact field.

15. The apparatus of claim 13, wherein the transmitting element is disposed upon the top surface.

16. The apparatus of claim 13, wherein the transmitting element is disposed upon the chassis of the IHS.

17. The apparatus of claim 8, wherein the first type of IC card is a contact smart card and the second type of IC card is a contactless smart card.

18. An information handling system (IHS) comprising:
a chassis;
a housing disposed within the chassis;
an apparatus for sensing an integrated circuit (IC) card, the apparatus in contact with the housing to form an inlet end of a slot for receiving at least one type of IC card, the apparatus in contact with the housing to further form a closed end of the slot, wherein the apparatus comprises:
 a bottom surface with a contact field disposed thereon for sensing a first type of IC card inserted within the slot; and
 a top surface in communication with a transmitting element for sensing a second type of IC card inserted within the slot.

19. The system of claim 18, wherein the housing is radio frequency (RF) transparent.

20. The system of claim 18, wherein the contact field is proximate to the closed end of the slot, the contact field with a plurality of contact pins mounted thereon to receive data from a first type of IC card received in the slot.

* * * * *